United States Patent [19]

Maeda et al.

[11] Patent Number: 4,820,097
[45] Date of Patent: Apr. 11, 1989

[54] FASTENER WITH AIRFLOW OPENING

[75] Inventors: Edwin V. Maeda, West Palm Beach; James R. Black, Palm Beach Gardens, both of Fla.

[73] Assignee: United Technologies Corporation, Hartford, Conn.

[21] Appl. No.: 170,484

[22] Filed: Mar. 18, 1988

[51] Int. Cl.⁴ ............................................. F16B 35/00
[52] U.S. Cl. .................... 411/366; 165/134.1; 165/168; 403/28; 403/408.1; 411/395; 411/427; 411/429
[58] Field of Search ............... 411/366, 402, 395, 427, 411/429, 381, 382, 171; 60/752, 755; 165/134.1, 168; 403/28, 34, 408.1

[56] References Cited

U.S. PATENT DOCUMENTS

| | | | |
|---|---|---|---|
| 1,601,845 | 10/1926 | Booth . | |
| 2,101,938 | 12/1937 | Giberson | 411/395 X |
| 2,292,102 | 8/1942 | Cluett | 174/153 |
| 2,320,398 | 6/1943 | Zetterquist | 165/134.1 X |
| 2,867,140 | 1/1959 | Getts | 411/395 X |
| 3,209,640 | 10/1965 | Waivers | 85/1 |
| 4,134,701 | 1/1979 | McEowen | 403/34 |
| 4,749,298 | 6/1988 | Bundt et al. | 165/134.1 X |

Primary Examiner—Lloyd A. Gall
Attorney, Agent, or Firm—Edward L. Kochey, Jr.

[57] ABSTRACT

Fastener 36 threaded to stud 32 carries disk 46 which retains panels 16. Cooling air 14 passes through an axial opening 34 cooling the center of the disk by impingement cooling. Uniformly spaced involute shaped openings 48 carry cooling air to cool the balance of the disk.

4 Claims, 2 Drawing Sheets

FASTENER WITH AIRFLOW OPENING

The Government has rights in this invention pursuant to a contract awarded by the Department of the Air Force.

TECHNICAL FIELD

The invention relates to fasteners for retaining liners in high temperature environments and in particular to an air cooled assembly therefor.

BACKGROUND OF THE INVENTION

Various products such as gas turbine engines require the conveyance of high temperature gas within ducts, nozzles, etc.. The walls of such passages require protection against the high temperatures. This protection may be in the form of panels which are air cooled and/or of special high temperature resistant materials.

Such panels must be retained on the walls with fasteners capable of withstanding the environment. Preferably the fastener is readily removable to permit replacement of parts.

There is a further advantage if the fastener itself can survive reasonable exposure to the hot gas. Otherwise, additional structure is required for protection of the fastener.

SUMMARY OF THE INVENTION

A threaded stud is secured to a substrate with an axial airflow opening therethrough which conveys cooling air. A fastener is threadedly engaged to the stud with the central chamber in communication with the opening through the stud and with a retaining disk at the outer edge of the stem. A plurality of equally spaced cooled openings extend through the retaining disk outwardly from the central chamber. These openings are in involute form thereby permitting a uniform cross section of the flow opening and providing a constant metal area between the openings. Air impinges on the center of the disk and flows through the cooling openings.

DESCRIPTION OF THE PREFERRED EMBODIMENT

Figure 1:
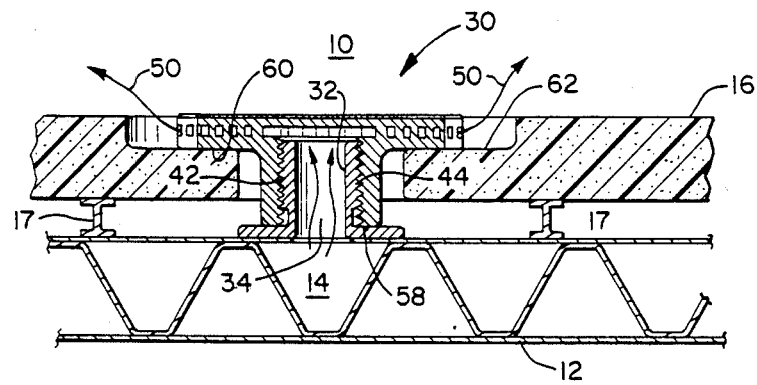
FIG. 1 is a sectional view of the fastener assembly holding a liner.
Figure 2:
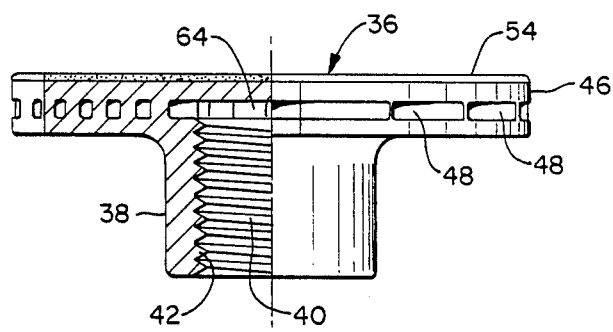
FIG. 2 is a partial section through the fastener.

High temperature gases 10 exiting from a gas turbine engine are passing through an exit nozzle having a wall formed of substrate 12. The substrate which must be protected from the hot gases has internal openings through which there is a supply of cooling air 14 which cools the substrate and is available for cooling other elements. A thermal barrier type liner 16 is to be secured within the duct to protect the substrate 12. This liner is held outwardly from the duct by rails 17.

A fastener assembly 30 is arranged to retain the panels in position. An externally threaded stud 32 is secured to the substrate 12 and has an axial opening 34 therethrough for the passage of cooling air from air supply 14. Fastener 36 has a hollow stem 38 with a central chamber 40. Internal threads 42 engage the external threads 44 of the stem. The central chamber, therefore, is in fluid communication with the opening 34 of the stud.

A retaining disk 46 is located at the end of the stem with a plurality of air cooling openings 48 passing therethrough.

Figure 3:
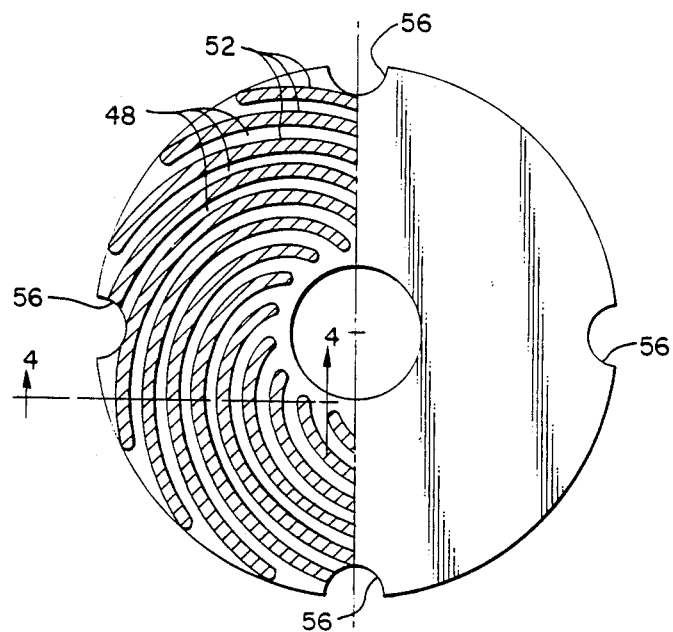
FIG. 3 is a partial plan section through the fastener.
Figure 4:
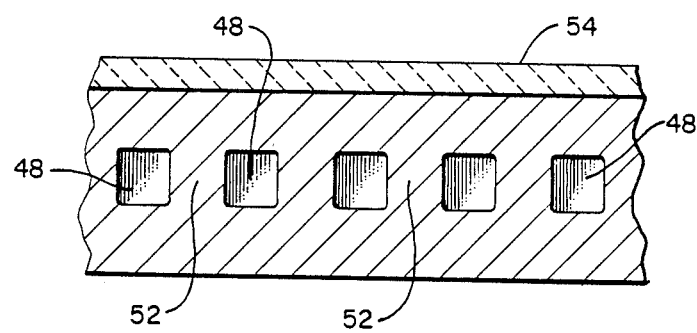
FIG. 4 is a sectional view through the cooling passages.

These openings are in fluid communication with central chamber 40 and pass to the outside surface to discharge cooling air 50 into the gas stream. These openings 48 are spaced from one another by metallic wall 52. Both the openings and the intervening walls are in the form of an involute. Accordingly, the thickness of wall 52 between the cooling ducts 48 as measured perpendicular to the flow (along section 4—4 of FIG. 3) provides a constant metal heat flow area. This contributes to uniform cooling of the retaining disk 46. A ceramic coating 54 is applied to the surface of the disk opposite to the stem with this surface preferably being imperforate.

Slots 56 on a periphery of the disk permit use of a tool to rotate the disk to screw the fastener into position. The lower edge 58 of the fastener bears against the upper surface of the lower shoulder of stem 32 while at the same time the lower surface 60 of the disk bears against the outwardly facing surface 62 of panel 16, thereby retaining the panel.

The circular shape of the disk provides a uniformly cooled structure and facilitates installation since no particular alignment is required. Accordingly, the fastener is simply screwed on until it bottoms out.

The annular portion of the disk overlaying the involute flow path is cooled by convection cooling within the flow path. The central portion 64 of the fastener is cooled by impingement cooling of air flow 34 passing upwardly through the fastener. Since impingement cooling is generally more effective than convection cooling, the velocity of the air through the central portion need not be as high as that for the involute passages. Accordingly a flow area of two to three times the involute flow area is appropriate for the internal passage. If desired, the central flow path or the inlet to the fastener may be orificed to selectively vary the cooling air flow between various fasteners.

The stud has external threads with the disk having internal threads. Accordingly, during operation the fastener which may be more readily replaced than the stud operates at a higher temperature than the stud, thereby minimizing the potential for having to repair a stud. The external positioning of the fastener with respect to the stud causes it to expand more than the stud during operation.

We claim:

1. A high temperature resistant fastener assembly for securing a thermal liner to a substrate comprising:
   a threaded stud secured to said substrate and having an axial opening therethrough, said axial opening in fluid communication with a supply of cooling air;
   a fastener formed of a hollow threaded stem having a central chamber and a retaining disk at the end of said stem, said fastener threadedly connected to said stud; and
   a plurality of equally spaced openings through said retaining disk extending outwardly from said central chamber in involute form and in fluid communication with said central chamber.

2. A fastener assembly as in claim 1:
   said stud having external threads; and
   said stem having internal threads.

3. A fastener assembly as in claim 1:
   the surface of said disk opposite of said stem being imperforate.

4. A fastener assembly as in claim 3:
   said surface of said disk being ceramic coated.

* * * * *